(12) United States Patent
Xu

(10) Patent No.: US 9,716,359 B1
(45) Date of Patent: Jul. 25, 2017

(54) MULTIFUNCTIONAL VEHICLE TOOL

(71) Applicant: Ye Xu, Sugar Land, TX (US)

(72) Inventor: Ye Xu, Sugar Land, TX (US)

( * ) Notice: Subject to any disclaimer, the term of this patent is extended or adjusted under 35 U.S.C. 154(b) by 0 days.

(21) Appl. No.: 15/227,270

(22) Filed: Aug. 3, 2016

(30) Foreign Application Priority Data

Jun. 28, 2016 (CN) .................. 2016 2 0652867 U

(51) Int. Cl.
- H01R 31/06 (2006.01)
- B25F 1/00 (2006.01)
- B26B 11/00 (2006.01)
- B60R 22/32 (2006.01)

(52) U.S. Cl.
CPC ............. *H01R 31/06* (2013.01); *B25F 1/006* (2013.01); *B26B 11/008* (2013.01); *B60R 22/32* (2013.01); *B60R 2022/328* (2013.01)

(58) Field of Classification Search
CPC ............ H01R 31/06; B60R 2011/0054; B60R 2022/328; B60R 22/32; B25F 1/006; B26B 11/008; A62B 3/005; B25D 2250/295; H02J 7/0029; H02J 7/0045
See application file for complete search history.

(56) References Cited

U.S. PATENT DOCUMENTS

| | | | | |
|---|---|---|---|---|
| 5,097,599 | A * | 3/1992 | Hasegawa | A62B 3/005 30/123 |
| 6,418,628 | B1 * | 7/2002 | Steingass | A62B 3/005 30/366 |
| 6,454,430 | B1 * | 9/2002 | Lin | A62B 3/005 362/109 |
| 7,351,111 | B2 * | 4/2008 | Cheng | H01R 27/02 439/638 |
| 7,557,720 | B2 * | 7/2009 | Rubin | A62B 3/005 340/321 |
| 8,146,192 | B2 * | 4/2012 | McGlynn | A62B 3/005 224/162 |
| 8,505,348 | B2 * | 8/2013 | Colasse | A62B 3/005 206/234 |
| 9,243,787 | B2 * | 1/2016 | Petrucelli | F21V 21/26 362/523 |
| 9,254,560 | B2 * | 2/2016 | Rubin | B25F 1/006 7/163 |
| 2015/0033477 | A1 * | 2/2015 | Rubin | B25D 5/02 7/158 |
| 2016/0038773 | A1 * | 2/2016 | Sun | A62B 3/005 7/144 |
| 2016/0105046 | A1 * | 4/2016 | Chen | A62B 3/00 320/107 |

* cited by examiner

Primary Examiner — David B Thomas
(74) Attorney, Agent, or Firm — Benjamin Aaron Adler

(57) ABSTRACT

Provided are multifunctional tools functioning as a cigarette lighter socket adapter, safety hammer and cutter used in a car. The multifunctional tool comprises a body portion, a striking mechanism, means for adapting the electricity from the cigarette lighter socket, and blades disposed in a inner surface of the a hook-shaped structure. The tool can be used as an electricity adapter converting the electricity from the cigarette lighter socket into various outlet ports, such as USB ports or any other types of outlet ports or connectors for electronic devices. The striking mechanism enables the striking member in the tool to be shoot out with a high impact force, breaking objects such as a car window. The blade is used to cut objects such as a seat belt when the user is trapped in a car in an emergency.

17 Claims, 8 Drawing Sheets

MULTIFUNCTIONAL VEHICLE TOOL

CROSS-REFERENCE TO RELATED APPLICATION

This non-provisional application claims benefit of priority under 35 U.S.C. §119(a) of Chinese Application No. 201620652867.X, filed Jun. 28, 2016, the entirety of which is hereby incorporated by reference.

BACKGROUND OF THE INVENTION

Field of the Invention

The present invention generally relates to the field of car accessories. More specifically, the present invention relates to a multifunctional device used as a cigarette lighter socket adapter, safety hammer and cutter in a car.

Description of the Related Art

The cigarette lighter socket has become one of the most commonly used accessories in a vehicle with the development of the electronic devices. Generally, a plug is used to provide electricity from the cigarette lighter socket for outlet ports or any other connectors to various electronic devices.

A car safety hammer is usually used to break car windows, or cutting a safety belt to protect life or possessions in an emergency. Currently, a car safety hammer is most commonly seen in buses or other vehicles for public transportation.

However, with increasing awareness of personal safety, more and more drivers are carrying a safety hammer in their personal vehicles.

Often, misplacing a regular safety hammer can easily distract the driver. Some drivers prefer to place the safety hammer in a glove box, console box or any other toolbox in the car. However, in an emergency such as a car crash, it could be difficult to access the safety hammer in time, defeating the purpose of having the safety hammer in the car. Furthermore, safety hammers in the market are generally not user friendly, and often provide very limited impact force to break car windows, resulting in uncertainty of the effectiveness of the safety hammer in a real emergency, especially for people with limited strength.

Therefore, there is a recognized need in the art for a user-friendly car safety hammer that can be placed in a highly accessibly place in a car, with improved impact force to break the windows of a vehicle, at the same time integrate the function of an adapter of a cigarette lighter socket. Particularly, the previous art is deficient in this aspect. The present invention fulfills this long-standing need and desire in the art.

SUMMARY OF THE INVENTION

The present invention is directed to a multifunctional device for a user of a car. The device comprises a body portion. The body portion comprises a proximal end that fits in a cigarette lighter socket of a car, a positive contact disposed at the proximal end of the body portion, and one or more negative retainers disposed on the side surface of the body portion. An opening is disposed in an axial direction of the body portion. A hook-shaped structure is formed on the body portion. A striking mechanism is disposed in the body portion configured to strike and break an object in an emergency. A blade is disposed on an inner surface of the hook-shaped structure. Means for adapting electricity is used to convert electricity from the cigarette lighter socket to outlet ports or any other types of ports or connectors to electronic devices.

The present invention is further directed to a multifunctional tool functioning as a cigarette socket adapter, safety hammer and cutter used in a car. The multifunctional tool comprises a body portion. The body portion comprises a proximal end that fits in a cigarette lighter socket of a car, a positive contact disposed at the proximal end of the body portion, and one or more negative retainers disposed on the side surface of the body portion. An opening is disposed in an axial direction of the body portion. A hook-shaped structure is formed on the body portion. A sliding holder comprising an axial opening is disposed in the opening of the body portion. The sliding holder is movable at the axial direction thereof with a proximal end extending out of the body portion. A floating spring is disposed against a back surface of the sliding holder. A striking member is disposed in the axial opening of the sliding holder. A striking spring is disposed around the striking member in the axial opening and against a stopper at a back end thereof. An alignment member comprising a guide ramp is configured to lift the striking member and align the striking member with a firing hole that is disposed on a proximal end of the body portion. A blade is disposed on an inner surface of the hook-shaped structure. Means for adapting electricity is used to convert the electricity from the cigarette lighter socket of a car.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1A:
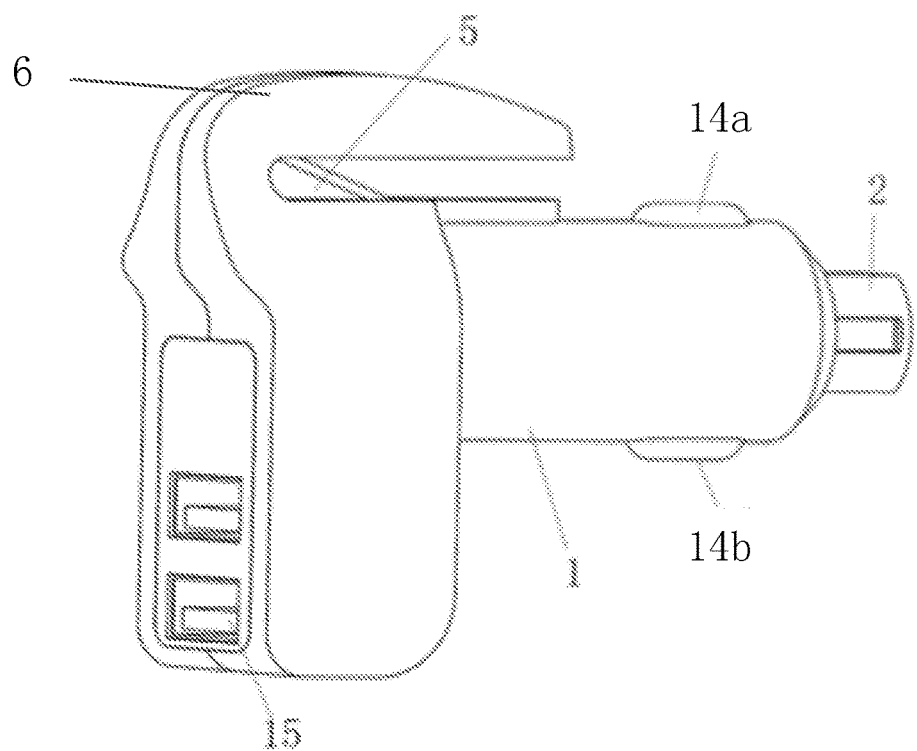
FIG. 1A is a perspective view of the multifunctional tool from the left and front side showing USB ports as the outlet ports for the adapter.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +1-5-10% of the recited value) that one of ordinary skill in the art would consider equivalent to the recited value (e.g., having the same function or result). In some instances, the term "about" may include numerical values that are rounded to the nearest significant figure.

As used herein, the term "proximal" refers to the end of the device that is nearer to the cigarette lighter socket". Similarly, the term "distal" refers to the end of the device that is farther away from the cigarette lighter socket.

In one embodiment of the present invention, there is provided a multifunctional device for a user of a car, comprising a body portion comprising an opening disposed in an axial direction of the body portion; a hook-shaped structure formed on the body portion; a striking mechanism disposed in the body portion; a blade disposed on a inner surface of the hook-shaped structure; and means for adapting electricity from a cigarette lighter socket of a car. The body portion comprises a proximal end that fits in a cigarette lighter socket of a car a positive contact disposed at the proximal end of the body portion; one or more negative retainers disposed on the side surface of the body portion. Preferably, the opening of the body portion is substantially cylindrical.

In this embodiment, the striking mechanism comprises a sliding holder comprising an axial opening, disposed in the opening of the body portion movable at the axial direction thereof, with a proximal end extending out of the body portion; a floating spring disposed against a back surface of the sliding holder in the opening of the body portion; a striking member disposed in the axial opening of the sliding holder; a striking spring disposed around the striking member in the axial opening; a stopper disposed at a back end of the axial opening against the striking spring; an alignment member formed on a inner surface of the body portion comprising a guide ramp configured to lift the striking member and align the striking member with a firing hole disposed on an proximal end of the body portion.

In this embodiment, the sliding holder comprises an opening at a bottom surface thereof disposed around the alignment member. The sliding holder is substantially cylindrical with a diameter substantially the same as a diameter of the opening disposed in an axial direction of the body portion. Preferably, the firing hole and the axial opening of the sliding holder are substantially concentric.

Still in this embodiment, the striking member comprises a striking head; a rod-shaped body; a ring-shaped shoulder formed between the striking head and rod-shaped body with a back surface in contact with the guide ramp of the alignment member; and a flange formed at the end thereof distal from the striking head. Preferably, the striking head is substantially cone-shaped.

Yet still in this embodiment, a diameter of the ring-shaped shoulder is substantially the same as a diameter of the axial opening of the sliding holder. Preferably, a front surface of the shoulder is against a side of the opening at the bottom of the sliding holder when the striking spring is not released. In this embodiment, the striking spring is disposed between a back surface of the ring-shaped shoulder and the stopper. The stopper tilts forward to push the striking spring and striking head downwards.

In another embodiment of the present invention, there is provided a multifunctional tool functioning as a cigarette lighter socket adapter, safety hammer and cutter used in a car, comprising a body portion that comprises a proximal end that fits in a cigarette lighter socket of a car, a positive contact disposed at the proximal end of the body portion, one or more negative retainers disposed on the side surface of the body portion; an opening disposed in an axial direction of the body portion; a hook-shaped structure formed on the body portion; a sliding holder comprising an axial opening, disposed in the opening of the body portion movable at the axial direction thereof, with a proximal end extending out of the body portion; a floating spring disposed against a back surface of the sliding holder in the opening of the body portion; a striking member disposed in the axial opening of the sliding holder; a striking spring disposed around the striking member in the axial opening; a stopper disposed at a back end of the axial opening against the striking spring; an alignment member comprising a guide ramp configured to lift the striking member and align the striking member with a firing hole disposed on a proximal end of the body portion; a blade disposed on a inner surface of the hook-shaped structure; and means for adapting electricity from a cigarette lighter socket of a car.

In this embodiment, the opening of the body portion is substantially cylindrical. The sliding holder comprises an opening at a bottom surface thereof, disposed around the alignment member.

In this embodiment, the sliding holder is substantially cylindrical with a diameter substantially the same as a diameter of the opening disposed in an axial direction of the body portion. Preferably, the firing hole and the axial opening of the sliding holder are substantially concentric.

In this embodiment, the striking member comprises a striking head; a rod-shaped body; a ring-shaped shoulder formed between the striking head and rod-shaped body with a back surface in contact with the guide ramp of the alignment member; and a flange formed at the end thereof distal from the striking head.

In this embodiment, the striking head is substantially cone-shaped. In a preferred embodiment, a diameter of the ring-shaped shoulder is substantially the same as a diameter of the axial opening of the sliding holder. In this embodiment, a front surface of the shoulder is against a side of the opening at the bottom of the sliding holder when the striking spring is not released.

In this embodiment, the striking spring is disposed between a back surface of the ring-shaped shoulder and the stopper. The stopper tilts forward to push the striking spring and striking head downwards.

Provided herein are multifunctional devices that function as both a cigarette lighter socket adapters and as a safety tool comprising a car safety hammer and a seat belt cutter. Particularly, embodiments of the present invention are better illustrated with reference to the Figure(s), however, such reference is not meant to limit the present invention in any fashion. The embodiments and variations described in detail herein are to be interpreted by the appended claims and equivalents thereof.

Figure 1B:
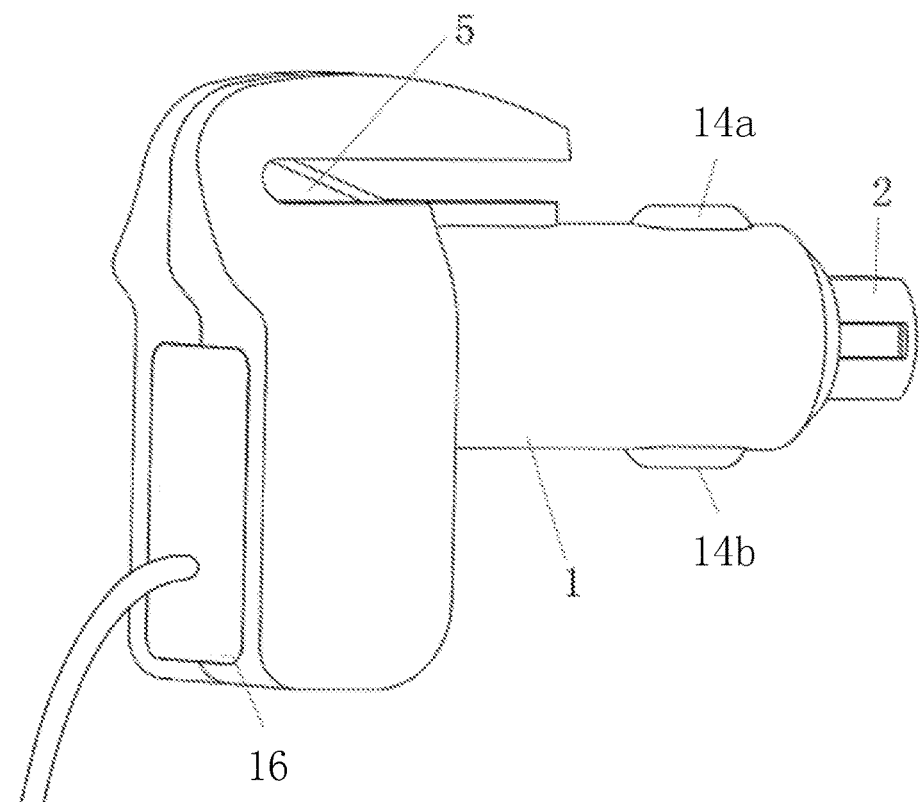
FIG. 1B is a perspective view of the multifunctional tool from the left and front side showing wired charger socket as the outlet connection for the adapter.

FIG. 1A depicts the device generally comprising the adapter and the safety tool. The device comprises a body portion 1 at a proximal end of the device and an external hook shaped structure 6 formed on top of the body portion at the distal end of the device. The body portion substantially contains a striking assembly with a safety hammer (see FIG. 2). The hook shaped structure comprises a blade 5 disposed on the inner surface of the hook-shaped structure and a plurality of output interfaces 15, such as USB ports disposed on the distal end thereof. The output interface may be any other types of connectors or ports for electronic connections. A sliding holder 2 is disposed in the body portion. The negative retainers 14a, 14b configured for conducting current from the cigarette lighter socket are disposed on the proximal end of the body portion. With continued reference to FIG. 1A, FIG. 1B shows a wired charger socket 16 as an alternative to a USB port.

Figure 2:
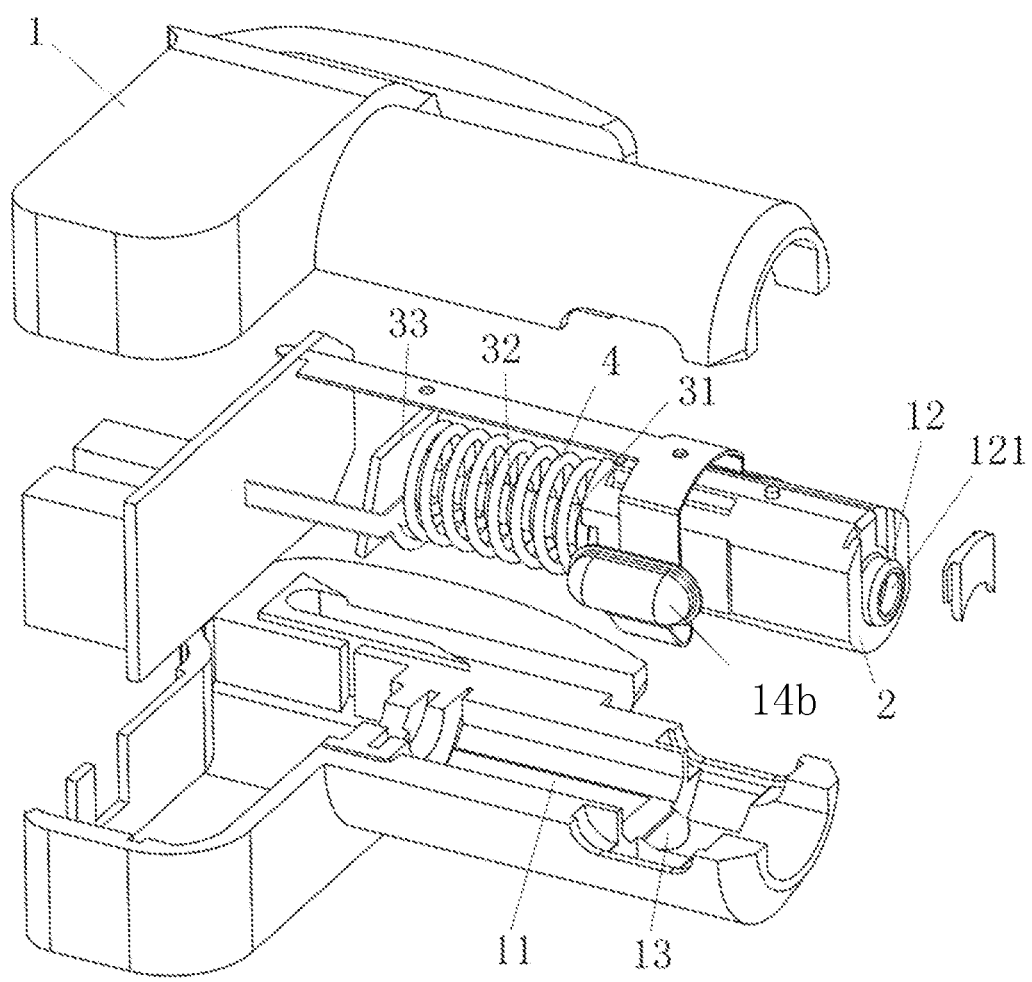
FIG. 2 is an exploded view of the multifunctional tool showing the left and right parts of the body portion and the inner structure thereof.

With continued reference to FIG. 1A, FIG. 2 is an exploded view of the device depicting the safety hammer. FIG. 2 shows a positive contact 12 disposed around a firing hole 121 through which the car safety hammer emerges. A striking assembly comprises a striking member 31, a striking spring 32 disposed around the striking member, a sliding holder 2 are disposed in a recess or socket 11 of the body portion, a floating spring 4 disposed against a back surface of the sliding holder, a stopper 33 disposed at the back end of a socket or recess 11 of the body portion, and an alignment member 13 formed on a inner surface of the body portion.

The proximal end of the body portion 1 forms the socket or recess 11 into which the sliding holder fits and slides in the axial direction thereof. The sliding holder is substantially in a shape of a hollow cylinder. The striking member 31 is movably disposed in the sliding holder. The opening 21 of the sliding holder and the firing hole 121 are substantially co-axial. The proximal end of the sliding holder extends through the proximal end of the body portion 1. When the device is used as a safety hammer, the sliding holder 2 triggers the striking assembly to shoot the striking member 31 thereof out of the body portion through the firing hole 121, resulting in a high impact striking movement, which enables the user to escape from the windows of the vehicle in an emergency.

Figure 3:
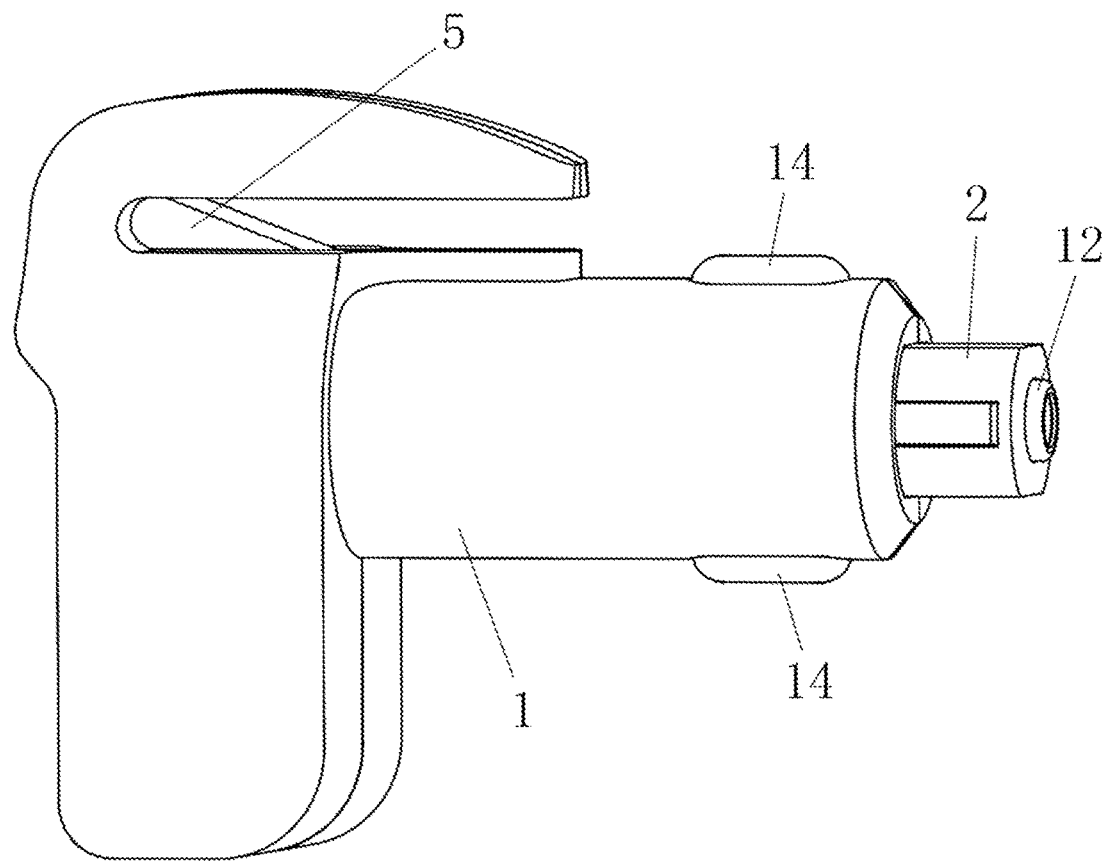
FIG. 3 is a perspective view of the multifunctional tool from the right and front side.

With continued reference to FIGS. 1A and 2, FIG. 3 is a perspective view of the device that better illustrates the positive contact 12 disposed at the proximal end of the sliding holder 2 around the firing hole 121. The positive contact 12 of the device conducts electricity through the floating spring 4 (see FIG. 2) in the body portion 1. Preferably, the firing hole is disposed substantially in the center of the positive contact. The body portion 1 of the device is a composite structure of two-halves for easy assembly (see FIG. 2).

Figure 4:
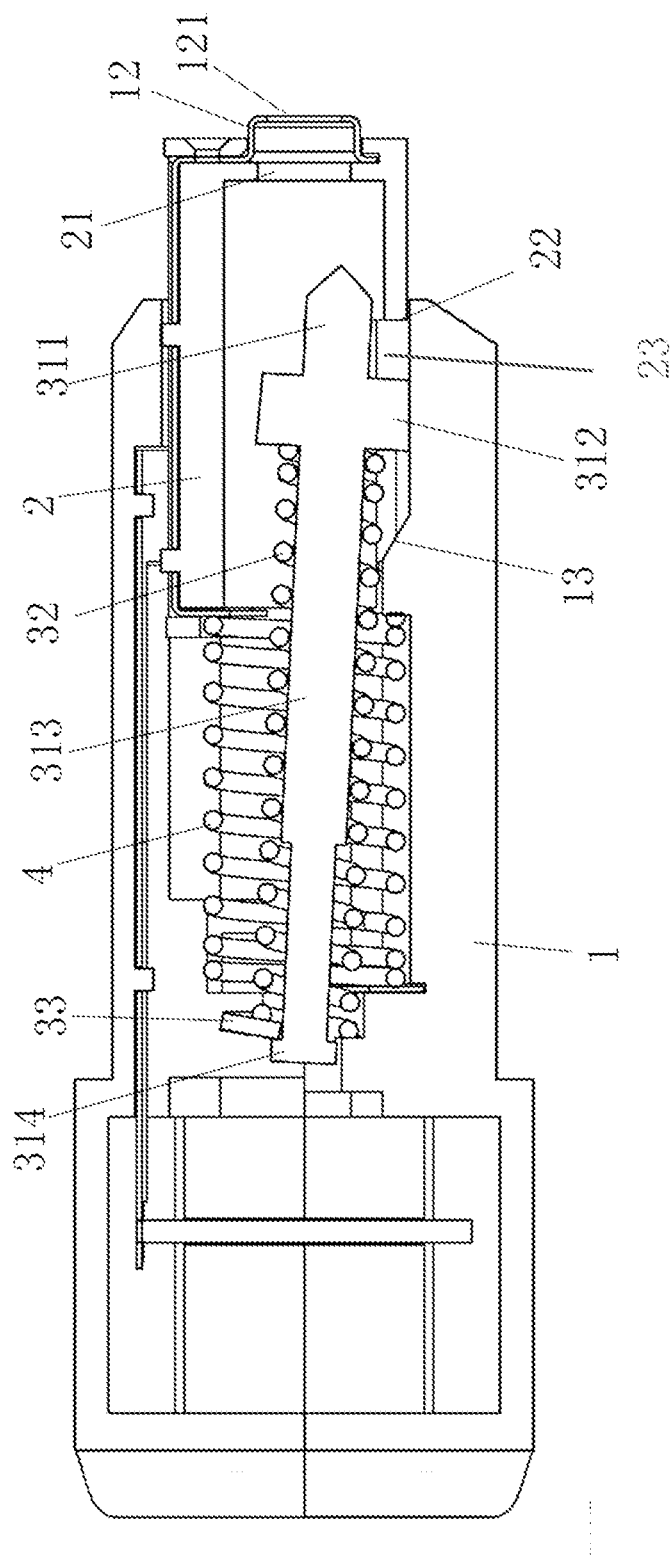
FIG. 4 is a sectional view of the multifunctional tool from the front view angle, showing the inner structure of the striking member and spring.

With continued reference to FIG. 2, FIG. 4 shows that the striking member comprises a substantially rod-shaped body 313, a shoulder 312 disposed around the proximal end of the rod-shaped body and a striking head 311 disposed on and proximal to the shoulder. A striking spring 32 is disposed around the striking member with a proximal end abutting the shoulder and a distal end abutting a proximal surface of stopper 33 that is disposed at the distal end of the socket of the body portion 1. A flange 314 with a diameter greater than that of the striking spring is formed at the distal end of the rod-shaped body of the striking member and is disposed through the stopper where a proximal surface of the flange abuts a distal surface of the stopper, such that the flange can limit the range of motion for the striking member. When the striking member is in motion, the shoulder 312 moves forward against the front surface of the proximal end of the body portion further control the range of the motion of the striking member. When the safety hammer is not in striking mode, the striking head 311 stays below the firing hole, and the sliding holder is pushed back, pressing against the striking spring 32. An alignment member 13 comprising a guide ramp is disposed directly under the striking member through an opening 22 on the bottom surface of the sliding holder. A transition gap 23 is disposed between the front side of the opening 22 and the shoulder 312 of the striking member to enable the function of the device as an adapter for the cigarette lighter socket and to avoid the misfiring of the safety hammer. The striking spring 32 is disposed around the striking spring. The stopper 33 tilts forwardly in an angle such that the striking member is pushed downwardly, keeping the striking head 311 off from the firing hole when it is not triggered.

Figure 5:
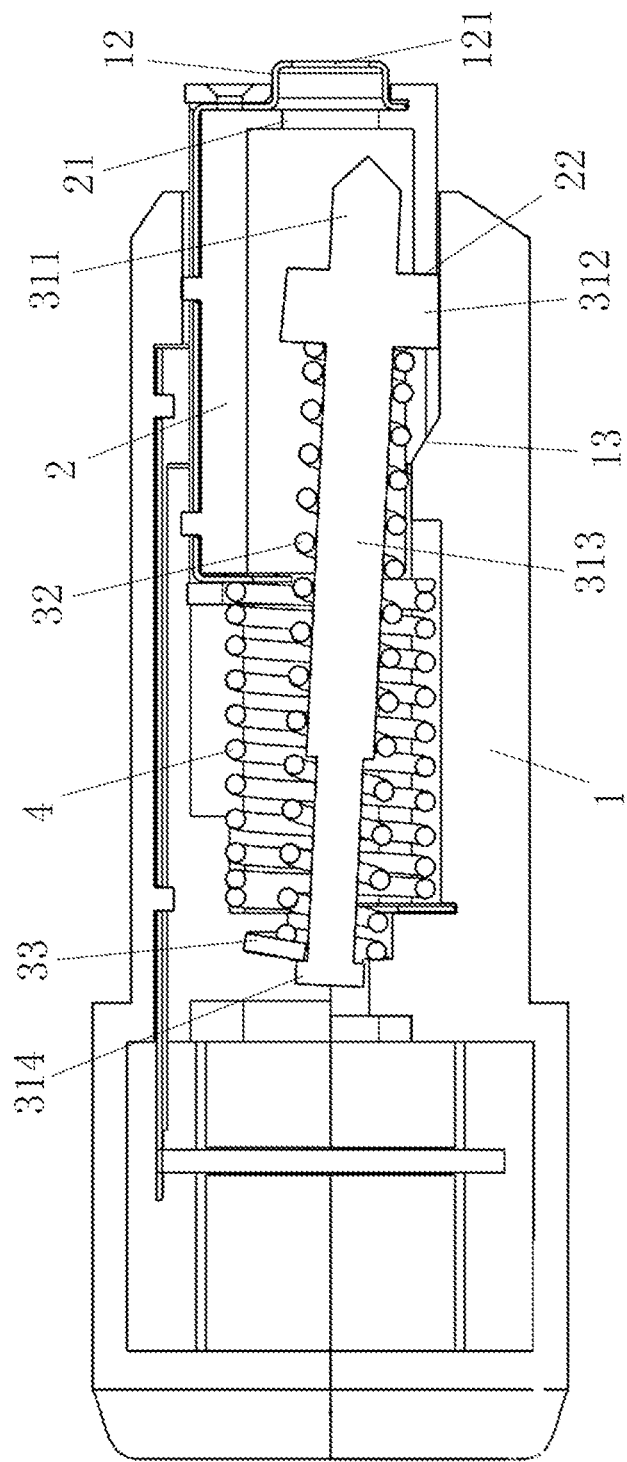
FIG. 5 is a sectional view of the multifunctional car safety hammer from the front view angle, showing the sliding holder pushing against the striking member thereof.

FIG. 5 depicts the front side of the opening 22 at the bottom of the sliding holder in contact with the shoulder 312 of the striking member. The alignment member 13 is configured to lift the shoulder 312 of the striking member. The diameter of the shoulder 312 is substantially the same as the inner diameter of the sliding holder 2, ensuring that the striking member is consistently and accurately aligned with the firing hole when the alignment member is triggered.

Figure 6:
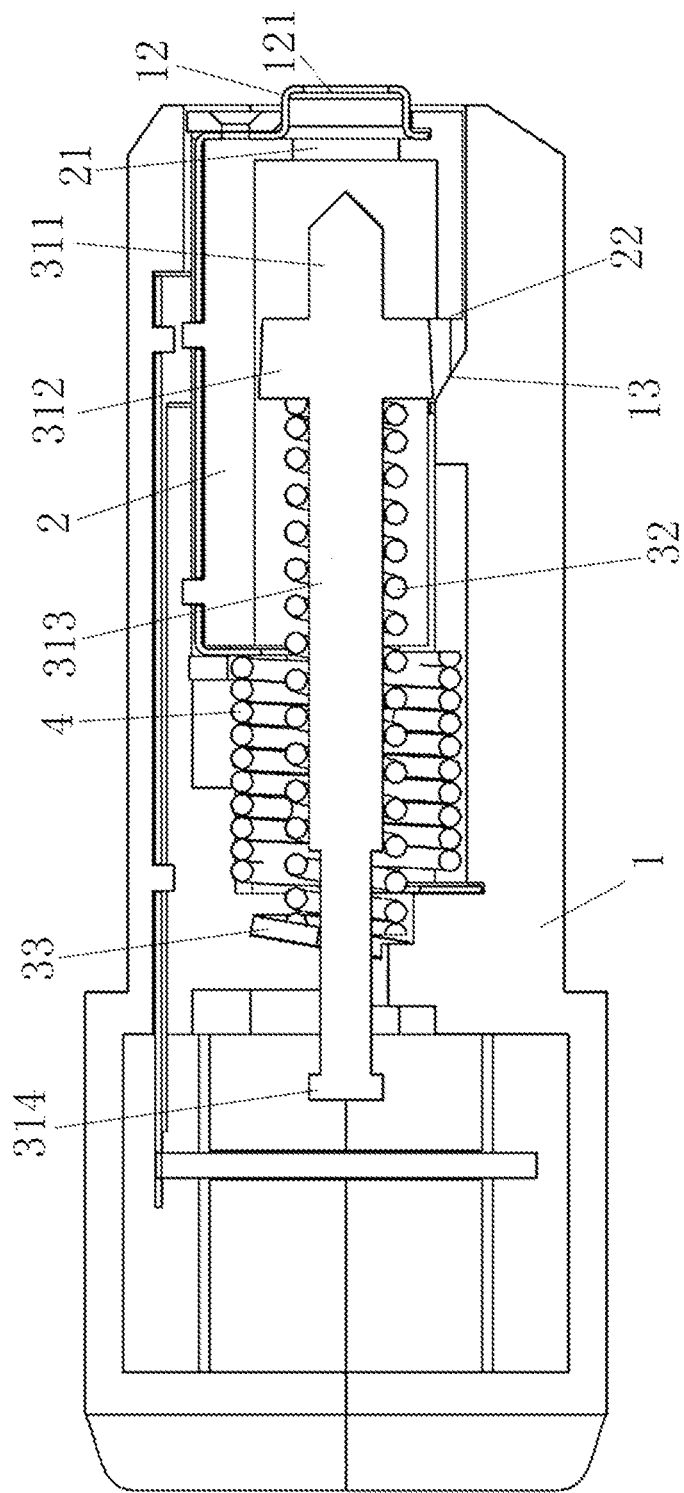
FIG. 6 is a sectional view of the multifunctional tool from the front view angle, showing the coaxial alignment member aligning the striking member to the firing hole.

FIG. 6 depicts the configuration of the device when the proximal end of the sliding holder 2 is pressed against a target, resulting in the holder 2 retracting toward the inside of the body 1. Consequently, the shoulder 312 of the striking member that is trapped in the opening 22 at the bottom of the holder is pushed backwards and pressing against the striking spring 32. At the same time the alignment member guide the shoulder 312 upwards to align the striking head with the firing hole while the shoulder 312 is lifted up off the opening 22, resulting in the release of the striking spring 32, which propels the striking head to shoot out of the firing hole.

Figure 7:
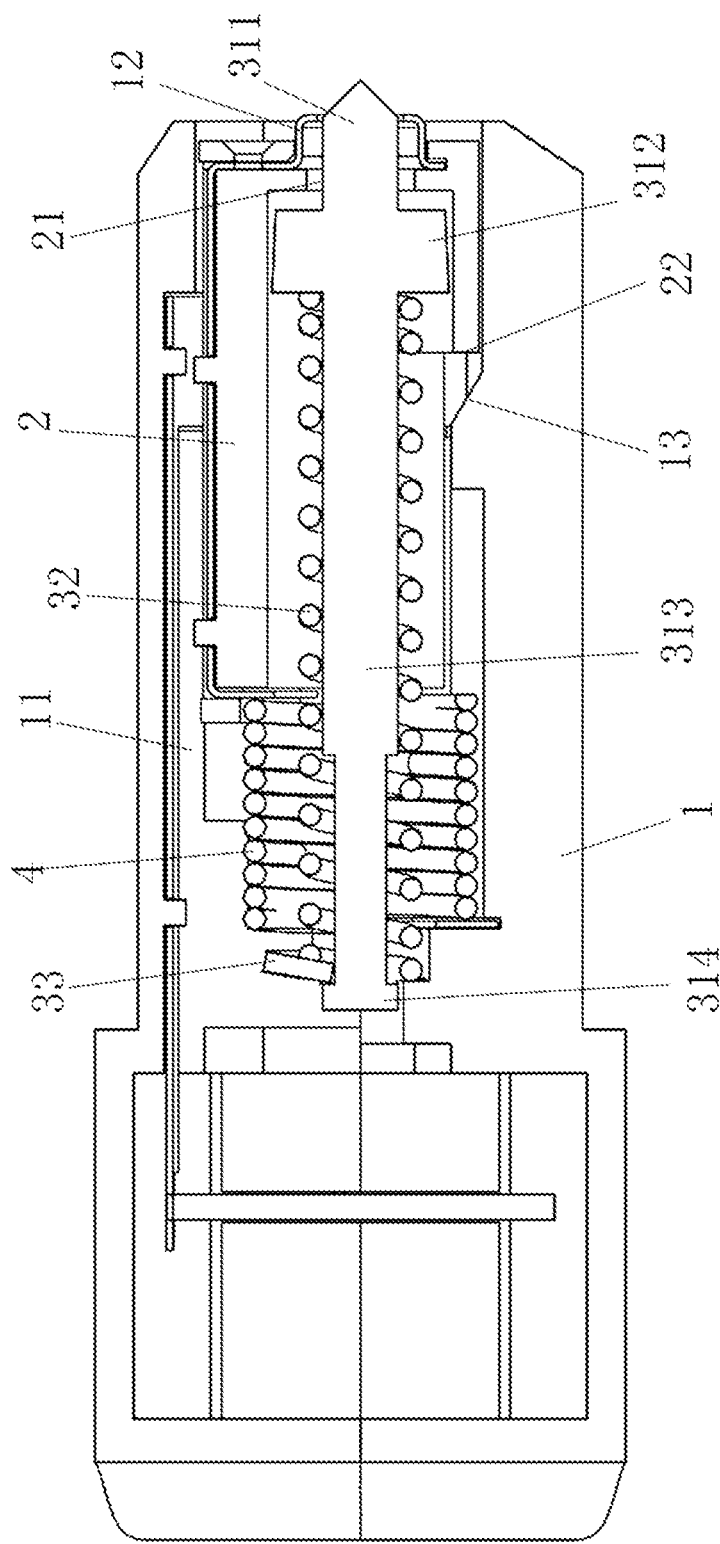
FIG. 7 is a sectional view of the multifunctional tool from the front view angle, showing the aligned striking member is fired through the firing hole to complete the striking on an object.

With continued reference to FIG. 6, FIG. 7 shows the striking member is out of the firing hole. Preferably, the striking head 311 is substantially cone-shaped, maximizing the ability to shatter the car window.

Figure 8:
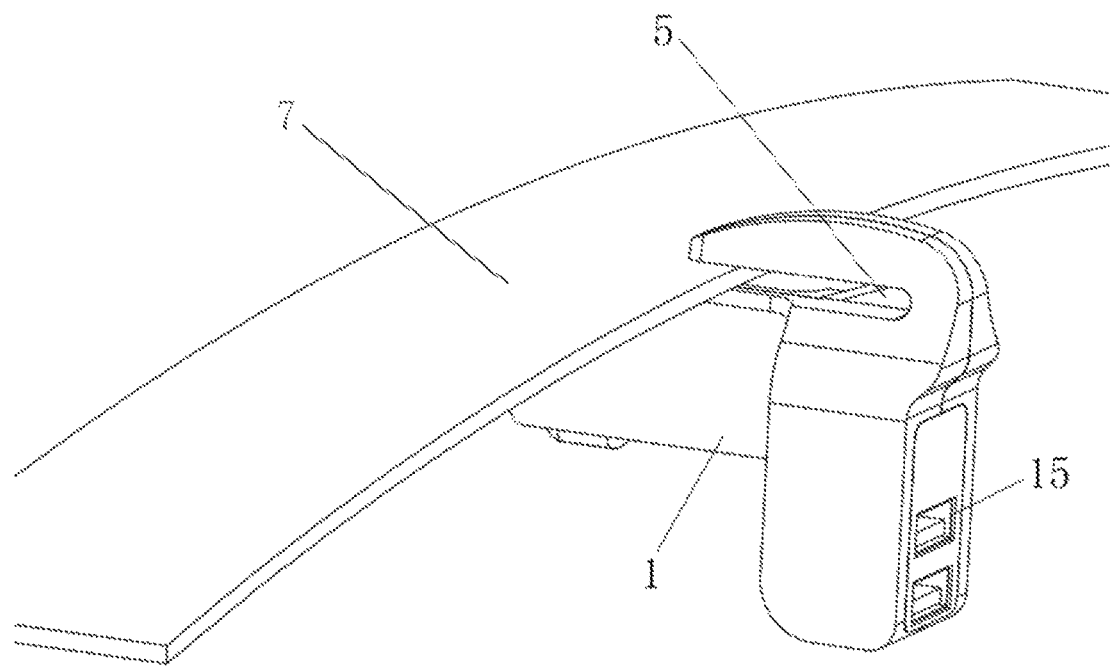
FIG. 8 illustrates how the multifunctional tool is used to cut a seat belt.

FIG. 8 illustrates the use of the blade 5 in the device. The external hook-like structure 6 is shaped to receive a seat belt 7 or other straps or objects therein to contact the blade disposed in the inner surface of the hook. The position of the blade enables the seat belt or other objects or straps to be cut to release a user or other individual trapped in a car in an emergency.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:
1. A multifunctional device, comprising:
a body portion comprising:

a proximal end that fits in a cigarette lighter socket of a car;
a positive contact disposed at the proximal end of the body portion;
one or more negative retainers disposed on the side surface of the body portion;
an opening disposed in an axial direction of the body portion;
a hook-shaped structure formed on the body portion;
a striking mechanism disposed in said body portion, comprising;
a sliding holder comprising an axial opening at a bottom surface thereof, disposed in said opening of the body portion movable at the axial direction thereof, with a proximal end extending out of the body portion;
a floating spring disposed against a back surface of the sliding holder in the opening of the body portion;
a striking member disposed in the axial opening of the sliding holder, comprising:
a striking head;
a rod-shaped body;
a ring-shaped shoulder formed between said striking head and rod-shaped body;
a flange formed at the end thereof distal from the striking head; and
a transition gap disposed between a front side of the opening of the sliding holder and the shoulder of the striking member;
a striking spring disposed around said striking member in the axial opening;
a stopper disposed at a back end of the axial opening against said striking spring; and
an alignment member disposed directly under the striking member through the opening of the sliding holder and formed on an inner surface of said body portion, said alignment member comprising a guide ramp in contact with a back surface of the ring-shaped shoulder of the striking member configured to lift said striking member and to align said striking member with a firing hole disposed on a proximal end of the body portion;
a blade disposed on an inner surface of the hook-shaped structure; and
means for adapting electricity from a cigarette lighter socket of a car.

2. The multifunctional device of claim 1, wherein said opening of the body portion is substantially cylindrical.

3. The multifunctional device of claim 1, wherein said sliding holder is substantially cylindrical with a diameter substantially the same as a diameter of the opening disposed in an axial direction of the body portion.

4. The multifunctional device of claim 1, said firing hole and said axial opening of the sliding holder are substantially concentric.

5. The multifunctional device of claim 1, wherein said striking head is substantially cone-shaped.

6. The multifunctional device of claim 1, wherein a diameter of said ring-shaped shoulder is substantially the same as a diameter of the axial opening of the sliding holder.

7. The multifunction device of claim 1, wherein a front surface of said shoulder is against a side of said opening at the bottom of the sliding holder when the striking spring is not released.

8. The multifunctional device of claim 1, wherein said striking spring is disposed between a back surface of said ring-shaped shoulder and the stopper.

9. The multifunctional device of claim 1, wherein said stopper tilts forward to push said striking spring and striking head downwards.

10. A multifunctional tool functioning as a cigarette socket adapter, safety hammer and cutter used in a car, comprising:
a body portion comprising:
a proximal end that fits in a cigarette lighter socket of a car;
a positive contact disposed at the proximal end of the body portion;
one or more negative retainers disposed on the side surface of the body portion;
an opening disposed in an axial direction of the body portion;
a hook-shaped structure formed on the body portion;
a sliding holder comprising an axial opening on a bottom surface thereof, disposed in said opening of the body portion movable at the axial direction thereof, with a proximal end extending out of the body portion;
a floating spring disposed against a back surface of the sliding holder in the opening of the body portion;
a striking member disposed in the axial opening of the sliding holder, comprising:
a striking head;
a rod-shaped body;
a ring-shaped shoulder formed between said striking head and rod-shaped body; and
a flange formed at the end thereof distal from the striking head; and
a transition gap disposed between a front side of the opening of the sliding holder and the shoulder of the striking member;
a striking spring disposed around said striking member in the axial opening between a stopper disposed at a back end of the axial opening against said striking spring and a back surface of the ring-shaped shoulder;
an alignment member, disposed directly under the striking member through the opening of the sliding holder, comprising a guide ramp in contact with a back surface of the ring-shaped shoulder of the striking member configured to lift said striking member and align said striking member with a firing hole disposed on an proximal end of the body portion;
a blade disposed on a inner surface of the hook-shaped structure; and
means for adapting electricity from a cigarette lighter socket of a car.

11. The multifunctional tool of claim 10, wherein said opening of the body portion is substantially cylindrical.

12. The multifunctional tool of claim 10, wherein said sliding holder is substantially cylindrical with a diameter substantially the same as a diameter of the opening disposed in an axial direction of the body portion.

13. The multifunctional tool of claim 10, said firing hole and said axial opening of the sliding holder are substantially concentric.

14. The multifunctional device of claim 10, wherein said striking head is substantially cone-shaped.

15. The multifunctional device of claim 10, wherein a diameter of said ring-shaped shoulder is substantially the same as a diameter of the axial opening of the sliding holder.

16. The multifunctional device of claim 10, wherein a front surface of said shoulder is against a side of said opening at the bottom of the sliding holder when the striking spring is not released.

17. The multifunctional device of claim 10, wherein said stopper tilts forward to push said striking spring and striking head downwards.

\* \* \* \* \*